(12) United States Patent

Mangold et al.

(10) Patent No.: US 6,524,548 B1
(45) Date of Patent: *Feb. 25, 2003

(54) ZIRCONIUM DIOXIDE POWDER, METHOD OF ITS PRODUCTION AND USE

(75) Inventors: Helmut Mangold, Rodenbach (DE); Werner Hartmann, Babenhausen (DE); Dieter Kerner, Midland Park, NJ (US); Peter Kleinschmit, Hanau (DE)

(73) Assignee: Degussa AG, Düsseldorf (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 722 days.

(21) Appl. No.: 09/067,915

(22) Filed: Apr. 29, 1998

Related U.S. Application Data

(63) Continuation-in-part of application No. 08/919,787, filed on Aug. 29, 1997, now abandoned, which is a continuation of application No. 08/745,311, filed on Nov. 12, 1996, now abandoned, which is a continuation of application No. 08/573,386, filed on Dec. 15, 1995, now abandoned.

(30) Foreign Application Priority Data

Dec. 17, 1994 (DE) .......................................... 44 45 205

(51) Int. Cl.$^7$ .............................................. C01G 25/00
(52) U.S. Cl. ........................................................ 423/608
(58) Field of Search ...................................... 423/608, 76

(56) References Cited

U.S. PATENT DOCUMENTS

| | | | | |
|---|---|---|---|---|
| 2,762,688 A | * | 9/1956 | Wainer .................... | 423/492 |
| 2,823,982 A | * | 2/1958 | Saladin et al. ............ | 423/608 |
| 3,419,351 A | * | 12/1968 | Zirngibl et al. ........... | 423/613 |
| 3,663,283 A | * | 5/1972 | Hebert et al. ............. | 423/76 |
| 3,954,945 A | | 5/1976 | Lange et al. ............. | 423/336 |
| 4,048,290 A | | 9/1977 | Lee ........................ | 423/608 |
| 4,083,946 A | * | 4/1978 | Schurr et al. ............. | 423/610 |
| 4,292,290 A | | 9/1981 | Tunison .................... | 423/336 |
| 4,360,598 A | | 11/1982 | Otagiri et al. ............ | 423/608 |
| 4,520,114 A | * | 5/1985 | David ...................... | 423/608 |
| 4,591,471 A | * | 5/1986 | Hori ........................ | 423/608 |
| 4,946,665 A | | 8/1990 | Recasens et al. .......... | 423/608 |
| 5,011,673 A | | 4/1991 | Kreichbaum et al. ....... | 423/608 |
| 5,155,071 A | * | 10/1992 | Jacobson .................. | 423/608 |
| 5,358,695 A | | 10/1994 | Helble et al. ............. | 423/608 |
| 5,391,362 A | | 2/1995 | Reinalda et al. .......... | 423/608 |
| 5,447,708 A | | 9/1995 | Helble et al. ............. | 423/608 |
| 5,472,477 A | | 12/1995 | Koenig ..................... | 75/343 |

FOREIGN PATENT DOCUMENTS

| | | | |
|---|---|---|---|
| DE | 2153671 | 5/1973 | |
| DE | 3115002 | 2/1982 | |
| DE | 3611449 | 10/1987 | |
| DE | 4214719 | 11/1993 | |
| EP | 241 647 | 10/1987 | |
| GB | 1003957 | * 9/1965 | ................. 423/608 |
| JP | 60-096 529 | 5/1985 | ................. 423/608 |
| JP | 61-111 919 | 5/1986 | ................. 423/608 |
| JP | 3-232724 | 10/1991 | ................. 423/608 |

OTHER PUBLICATIONS

Brockhaus ABC Chemie, 1965, pp. 1571–1572, No month.
Roempp Chemie Lexikon, Falbe, et al., pp. 5155–5157, 1992, No month.
Lexikon der Hilfsstoffe fuer Pharmazie, Kosmetik und angrenzende Gebeieite, 1989, Dr. Her Fiedler, pp. 1367–1368, No month.

* cited by examiner

*Primary Examiner*—Steven Bos
(74) *Attorney, Agent, or Firm*—Smith, Gambrell & Russell, LLP

(57) ABSTRACT

Pyrogenically, especially flame-hydrolytically produced zirconium dioxide powder with a specific surface area between 20 and 200 m$^2$/g, a primary particle size between 7 and 100 nm, a tamped density of the deacidified and non-deacidified zirconium dioxide between 40 and 150 g/l with Sears numbers of the deacidified and non-deacidified zirconium dioxide between 1 and 20 ml/2 g and with a chlorine content of the deacidified zirconium dioxide less than 0.6% by weight. These are produced by evaporating zirconium halides, mixing the vapors alone or together with a carrier gas in a burner with air, oxygen, nitrogen and hydrogen, causing the gases to react with each other in a flame in a closed burner chamber, cooling off the waste gases and the zirconium dioxide in a heat exchanger unit, separating the waste gases from the zirconium dioxide and removing any halide remnants adhering to the zirconium dioxide by a heat treatment with moistened air.

6 Claims, 3 Drawing Sheets

ZIRCONIUM DIOXIDE POWDER, METHOD OF ITS PRODUCTION AND USE

This document is a continuation-in-part of our application Ser. No. 08/919,787, filed Aug. 29, 1997, now abandoned, which is relied on and incorporated herein in its entirety, and which is a continuation of Ser. No. 08/745,311, filed Nov. 12, 1996, now abandoned, which is a continuation of Ser. No. 08/573,386, filed Dec. 15, 1995, now abandoned.

The present invention relates to a zirconium dioxide powder, the method of its production and its use.

Zirconium dioxide powder can be used in very different areas such as e.g. electronics, ceramic components, fireproof materials and catalysis.

It is known that zirconium dioxide powder can be produced by flame hydrolysis (DE 36 11 449). The known zirconium dioxide powder has a surface area of 104 m$^2$/g and a chloride content of 2.66% by weight.

The known zirconium dioxide powder has the disadvantage that it tends to cake in the flame reaction tube during production and therefore causes undesired interruptions of the operation.

An object of the present invention is to produce a zirconium dioxide powder not having these disadvantages.

SUMMARY OF THE INVENTION

In achieving the above and other objects, one feature of the present invention is a pyrogenically, especially flame-hydrolytically produced zirconium dioxide powder which is characterized in that the specific surface area of the zirconium dioxide range from 20 to 200 m$^2$/g, the primary particles, which may be coalesced to each other, range from 7 to 100 nm in size, the tamped density of the deacidified and non-deacidified zirconium dioxides range from 40 to 150 g/l, the Sears numbers of the deacidified and non-deacidified zirconium dioxides range from 1 to 20 ml/2 g and the chlorine content of the deacidified zirconium dioxides is less than 0.6% by weight. The Sears number of the zirconium dioxide is the same as the range discussed above regardless of whether the zirconium dioxide is in the deacidified or the non-deacidified state.

In particular, the zirconium dioxide powder of the present invention can have the following physico-chemical characteristic data:

| | |
|---|---|
| ZrO$_2$ (% by weight) | 96–100 |
| HfO$_2$ (% by weight) | 4–0 |
| Chlorine content non-deacidified (% by weight) | 2–4 |
| Chlorine content deacidified (% by weight) | <0.6 |
| Specific surface area (m$^2$/g) | 20–200 |
| Primary particle size (nm) | 7–100 |
| Tamped density of the deacidified and non-deacidified zirconium dioxide (g/l) | 40–150 |
| Crystal phase of the non-deacidified zirconium dioxide | tetragonal and cubic, small amount monoclinic |
| Crystal phase of the de-acidified zirconium dioxide | monoclinic and tetragonal |
| Sears number of the de-acidified and of the non-deacidified zirconium dioxide (ml/2 g) | 1–20 |

In accordance with another feature of the invention, the method of producing the pyrogenically, especially flame-hydrolytically produced zirconium dioxide powder is carried out starting with zirconium halides, preferably the chloride, which is evaporated, the resulting vapor is mixed alone or together with a carrier gas, e.g. nitrogen, in a mixing unit in a burner with other gases; i.e. air, oxygen, nitrogen and hydrogen. The gases are caused to react with each other in a flame in a closed combustion chamber to produce the zirconium dioxide and waste gases. Then the hot waste gases and the zirconium dioxide are cooled off in a heat-exchanger unit, the waste gases are separated from the zirconium dioxide and any halide remnants adhering to the zirconium dioxide obtained are removed by a heat treatment with moistened air.

BRIEF DESCRIPTION OF DRAWINGS

The present invention will be further understood with reference to the drawings, wherein.

DETAILED DESCRIPTION OF THE INVENTION

The method for producing the pyrogenically, especially flame-hydrolytically produced zirconium dioxide in accordance with the invention has the following advantages:

The purposeful changing of the ratios of the gas amounts used for the reaction and thus the flame parameters such as e.g. excess of air leading to the precise setting of the parameters of the zirconium dioxide is possible in a very simple manner.

No emissions of chlorine-containing gases such as e.g. HCl or Cl$_2$ are produced since the work is performed in a closed system.

Cakings of the zirconium dioxide in the lines are avoided. For this reason a continuous production is possible over long time periods, e.g. over several days, without cleaning measures being necessary.

According to the invention, cakings are also avoided during the charging of ZrCl$_4$ because a partial vacuum can be produced in the apparatus for the evaporation of ZrCl$_4$ via the closed method of operation. The gases can then expand into the combustion chamber. The zirconium dioxide powder produced in accordance with the invention can be readily deacidified, during which chloride contents of less that 0.6% by weight are achieved. Due to the surprisingly low chloride content the zirconium dioxide of the invention can be readily used to produce ceramics.

A further feature of the invention is the use of the zirconium dioxide powder as an initial product for the production of ceramics and ceramic fabricated intermediate materials, as filler, in the electronics industry, as heat-damping material, as a catalytic substances, as carrier materials for catalysts as well as use in the cosmetics industry.

EXAMPLES

Figure 1:
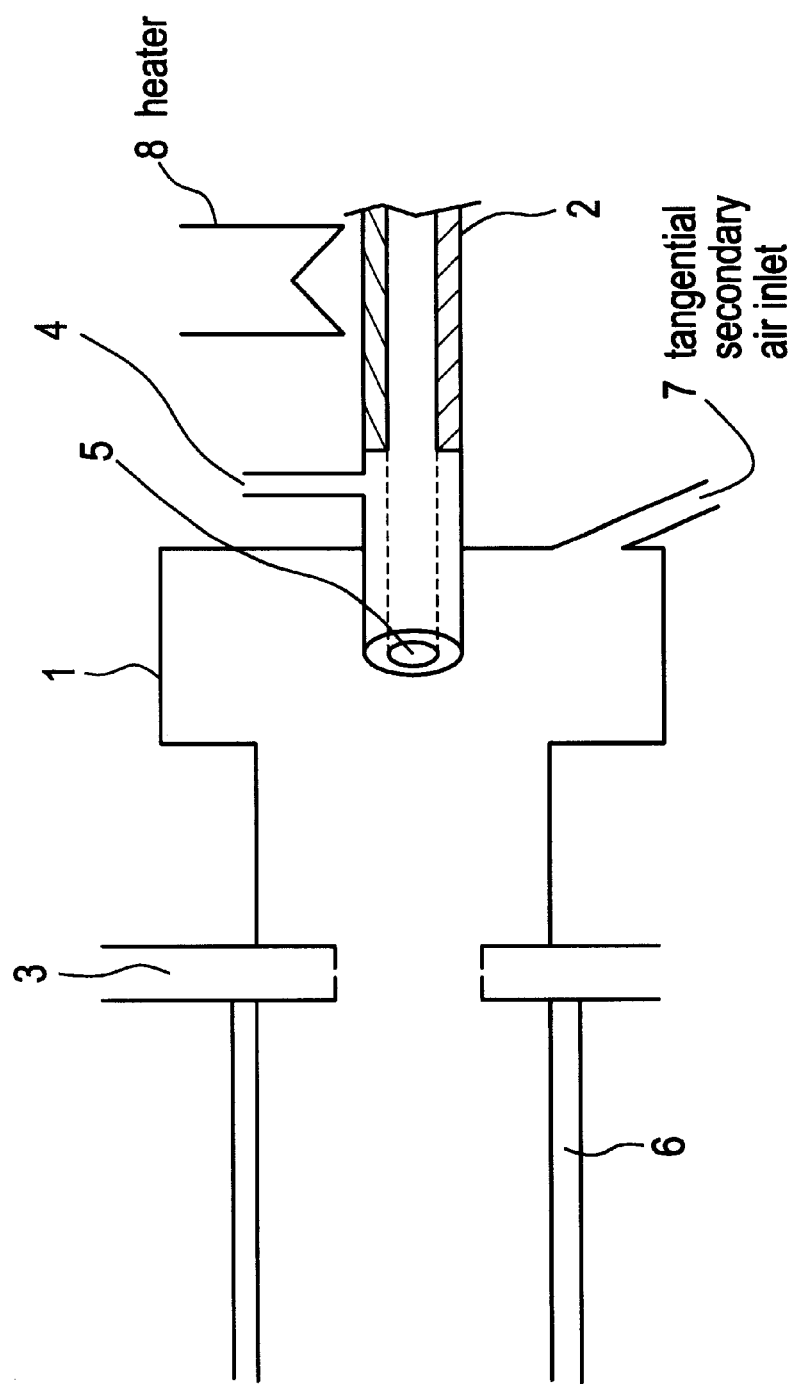
FIG. 1 is a schematic view of the burner apparatus used in the method of the invention.

According to a more detailed aspect of the invention, FIG. 1 shows a schematic view of the burner arrangement used in the method according to the invention. Double-jacketed tube 2 extends into combustion chamber 1. Heating source 8 heats the tube 2. Secondary air 7 is blown tangentially into combustion chamber 1.

Diaphragm ring 3 is located behind combustion chamber 1, which can serve to introduce additional air through the opening in said ring in order to be able to stabilize and cool off the flame.

The initial product of the reaction is $ZrCl_4$ vapor and this is conducted together with "primary air" into the inner tube 5 of double-jacketed tube 2. Hydrogen gas can also be selectively introduced here.

Only the last part of double-jacketed tube 2; i.e., the downstream end is designed as a genuine double jacket. Hydrogen is conducted to the flame in this last part by means of annular jet 4.

The primary air is heated to temperatures of approximately 400° C. before it is mixed with $ZrCl_4$ vapor.

The $ZrCl_4$ is evaporated in a heated solids evaporator (not shown) having a temperature of approximately 530° C. The mass flow of solid $ZrCl_4$ is measured by a differential dosing balance and charged into the heated evaporator.

From the solids evaporator the zirconium tetrachloride vapor is conducted, using a carrier gas, a current of nitrogen (500 to 1,500 l/h) into inner tube 5 of double-jacketed tube 2, where it mixes with the hot primary air.

The hydrogen necessary for the flame hydrolysis is fed exclusively into the outer downstream part of the annular jacket or into inner tube 5 of double-jacketed tube 2. The hydrogen can be preheated.

Double-jacketed tube 2 is heated up to the entry point of the hydrogen. An electric heating is placed around the outer tube which up to this point is designed as solid material which assures that the gaseous mixture in the interior has a temperature of at least 380° C.

The discharge velocity of the gases must be above the flame-propagation velocity of the gases, preferably in a range of 10 to 50 m/sec, normalized to normal temperature and pressure conditions.

The flame burns in a hose-like manner into water-cooled flame tube 6.

Diaphragm ring 3 is located in front of the flame tube, from which ring diaphragm air exits directed annularly toward the interior of the tube. This device serves to stabilize and quench the flame.

Table 1 shows various experimental conditions for producing pyrogenic zirconium dioxide.

After passing through the flame tube, the zirconium dioxide obtained is separated according to known methods, e.g. in a filter or by cyclones, from the gases containing hydrochloric acid or chlorine.

The zirconium dioxide can be freed from adhering remnants of hydrochloric acid in a further step by a thermal treatment.

TABLE 1

| | | Air | | | | | | Charge Me- |
|---|---|---|---|---|---|---|---|---|
| No. | Primary | Secondary [$Nm^3/h$] | Blend | $H_2$ [$Nm^3/h$] | Jet [mm] | $ZrCl_4$ [kg/h] | $N_2$ [$Nm_3/h$] | Vapor [$g/Nm^3$] |
| 1 | 6.00 | 6.00 | 6.00 | 1.50 | 12.00 | 1.6 | 1.5 | 209.1 |
| 2 | 10.0 | 6.00 | 6.00 | 1.40 | 12.00 | 1.6 | 1.5 | 137.3 |
| 3 | 10.0 | 6.00 | 6.00 | 1.40 | 12.00 | 0.8 | 1.5 | 69.1 |
| 4 | 6.00 | 6.00 | 6.00 | 2.20 | 12.00 | 2.0 | 1.5 | 260.0 |
| 5 | 7.00 | 9.00 | 1.00 | 2.50 | 17.00 | 2.6 | 0.5 | 333.3 |

| | Ratio | | BET | Sears | Bulk wt. | Tamped density | Deacid- | pH 4% Suspen- | Chloride Content |
|---|---|---|---|---|---|---|---|---|---|
| No. | $H_2$ | $O_2$ | [$m^2/g$] | [ml/2 g] | [g/l] | [g/l] | ification | sion | [wt.-%] |
| 1 | 4.88 | 5.04 | 70.0 | 7.93 | 66.0 | 78.0 | no | 2 | >2 |
| 2 | 4.56 | 6.60 | 89.0 | 9.59 | 59.0 | 68.0 | no | 2 | >2 |
| 3 | 9.11 | 6.60 | 102.0 | 10.66 | 56.0 | 65.0 | no | 2 | >2 |
| 4 | 5.73 | 3.44 | 81.0 | 6.36 | 54.0 | 66.0 | no | 2 | >2 |
| 5 | 5.01 | 2.86 | 37.0 | 3.0 | 61.0 | 78.0 | yes | 3.25 | 0.4 |

Table of the experimental conditions and analytical results in the production of zirconium dioxide Examples 1 to 4

Physico-chemical Data Relative to Non-deacidified Zirconium Dioxide

Example 5

Physico-chemical Data Relative to Deacidified Zirconium Dioxide

Abbreviations air, primary=primary air in the inner tube mixed with $ZrCl_4$ vapor; Blend=diaphragm air from annular jet; second-=secondary air; jet=inner jet diameter; charge Me-vapor=charge of the air-gas mixture with metal halide vapor $ZrCl_4$; ratio $H_2$=ratio of total hydrogen introduced to stoichiometrically required hydrogen; ratio $O_2$=ratio of total oxygen introduced to stoichiometrically required oxygen; BET=specific surface area; Sears=Sears number; bulk=bulk weight; tamp=tamped density.

Determination of Tamped Density

The tamped density is measured in accordance with the German Industrial Standard (DIN). The DIN 53 194 standard is used to determine the tamped volume and the tamped apparent density of powders and granulates. The tamped apparent density of a powdery or granulated material according to this standard is the mass in grams that one cubic centimeter of the material takes on in the settling volume meter after tamping occurs under specified conditions. The test is performed by selecting a sample of the material to be tested, placing the sample to be tested into a graduated cylinder of defined size and shape. The graduated cylinder is then placed in a holder and the material is tamped 1,250 times. The volume of the sample in the graduated cylinder is then read from the scale of the graduated cylinder. The sample is then tamped further in rounds of 1,250 tampings each until the difference between the volumes after two successive rounds of tamping is less than 2% with respect to the higher value. The tamped apparent density is then determined by the formula tamped apparent density=E/V, in which E=the originally weighed quantity, and V=the volume of the sample after the final tamping. The DIN 53 194 is relied on and incorporated herein by reference.

Determination of the Sears Number, Titrated from pH 4 to pH 9

The Sears number corresponds to the consumption of 0.1 N NaOH which is required to adjust a defined $ZrO_2$ suspension from pH 4 to pH 9.

Procedure 2 g $ZrO_2$ are compounded in a 400 ml beaker with 200 ml of a saturated NaCl solution and then treated 1 min. with a dry Ultra-Turrax agitator. After thorough agitation the greater part of the solution still present in the agitator head is thrown on the beaker wall by briefly cutting in the agitator held above the liquid. The drops suspended on the outside of the agitator are removed by brushing them off with a beaker. The specimen prepared in this manner is placed in a double-walled titrating vessel. The beaker is rinsed with 2 to 3 ml distilled water and the drops are added to the solution in the titrating vessel. In no case should more rinsing water be used, in order that the volume of the specimen remains constant. A further 25 g sodium chloride is added to this suspension. Water is pumped at 25° C. through the double jacket of the titrating vessel. In the actual titration which now follows, 0.1 N-sodium hydroxide solution is added, at first in a rapid sequence of drops and considerably more slowly toward the end of the titration until the pH of 9 has been reached.

The Sears number (pH 4 to pH 9) corresponds to the consumption of 0.1 N NaOH weighed portion within the indicated range of the pH.

In the examples the hydrogen is introduced exclusively into the outer ring of double-jacketed tube 2.

Reference Example

Approximately 150 kilograms pyrogenic zirconium dioxide are produced with the following procedure in accordance with the known method (open burner).

Figure 2:
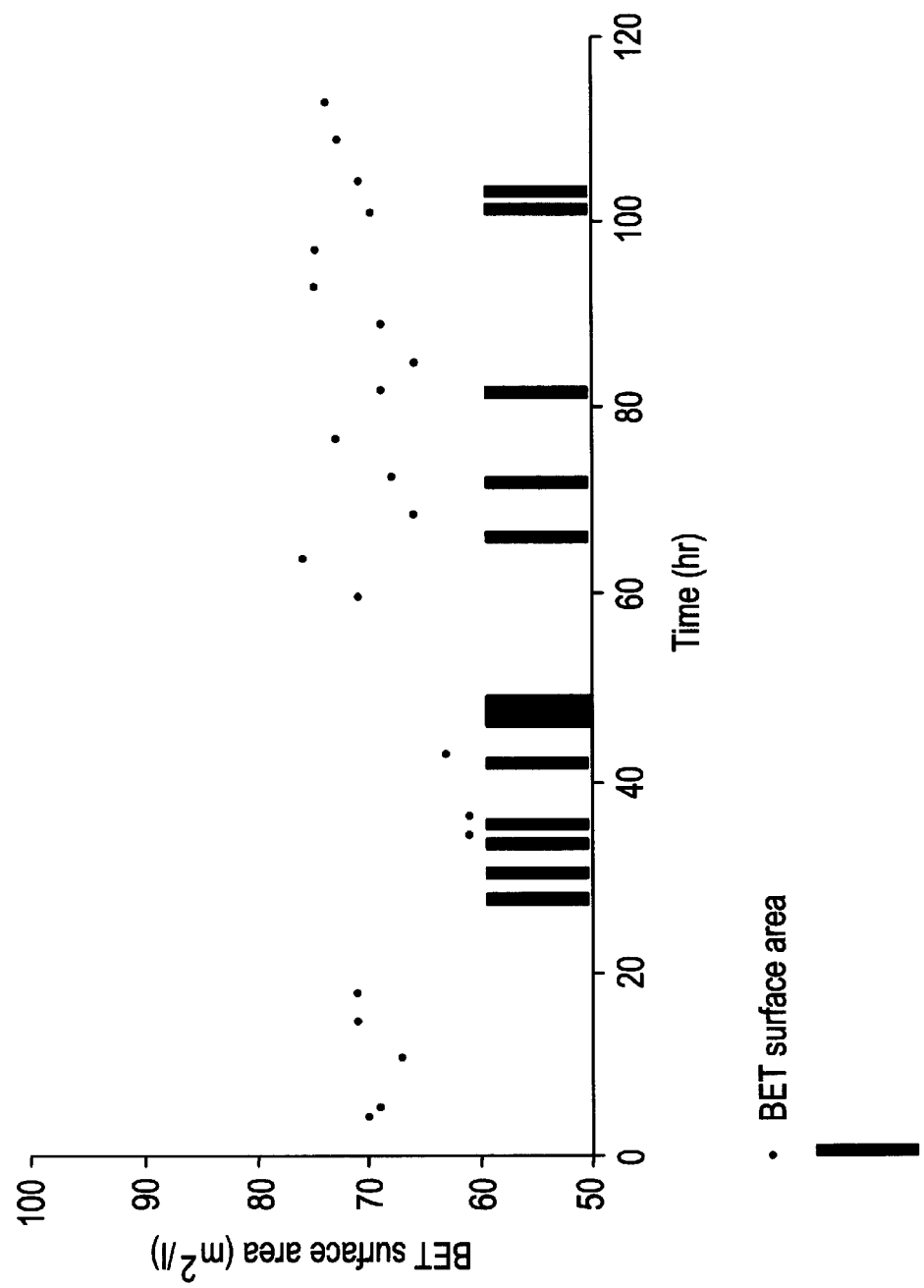
FIG. 2 is a graph showing the plot of surface area with time, according to methods of the prior art.

Evaporator air: 4 $Nm^3/h$
Jacket $H_2$: 1 $Nm^3/h$
Carrier $N_2$: 0.5 $Nm^3/h$
$ZrCl_4$: 3 kg/h
Specific surface area (average) of the non-deacidified zirconium dioxide (BET): 69.5 $m^2/g$ FIG. 2 is a plot of a graph showing the specific surface area over time when the process is carried out according to the known method of the art:

The production must be unintentionally interrupted a total of 11 times in the course of 120 hours because of cakings that occur in the flame area and during product charging which prevents continuing with production. The system must be restarted after each interruption (10 interruptions up to 2 hours and one interruption of more than 5 hours).

Figure 3:
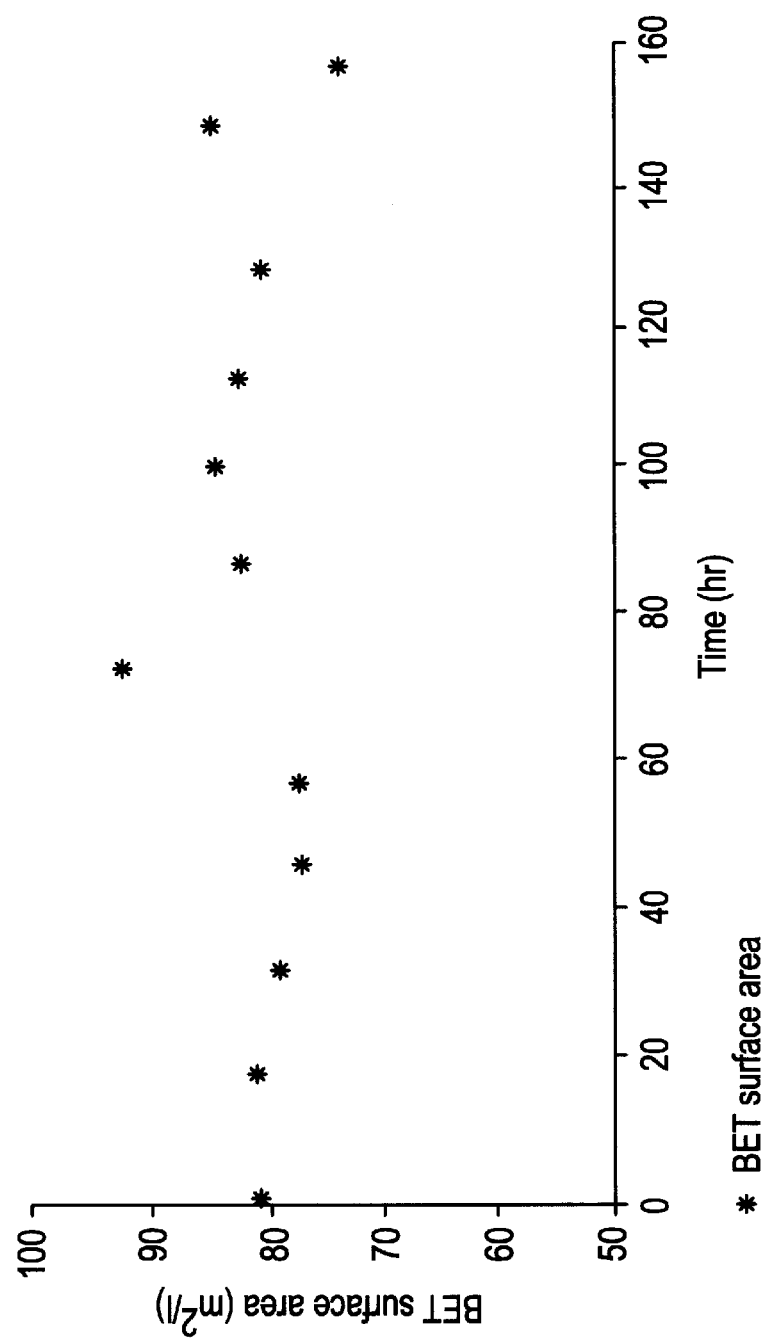
FIG. 3 shows a plot of surface area with time according to the method of this invention.

FIG. 3 shows results in accordance with the invention over time corresponding to example 4. No cakings are observed in the flame area and during product charging. No interruptions of production occur.

Further variations and modifications of the foregoing will be apparent to those skilled in the art and are intended to be encompassed by the claims appended hereto.

We claim:

1. A pyrogenically produced zirconium dioxide powder, prepared by flame hydrolysis, having a specific surface area of from 20 to 200 $m^2/g$, primary particles of from 7 to 100 nm in size, a tamped apparent density from 40 to 150 g/l, a Sears number of from 1 to 20 ml/2 g, and a chlorine content of less than 0.6% by weight.

2. The pyrogenically produced zirconium dioxide powder according to claim 1, wherein at least some of the primary particles are coalesced.

3. A flame hydrolysis method of producing a pyrogenically-produced zirconium dioxide powder having a specific surface area of from 20 to 200 $m^2/g$, primary particles of from 7 to 100 nm in size, a tamped apparent density from 40 to 150 g/l, a Sears number of from 1 to 20 ml/2 g, and a chlorine content of less than 0.6% by weight, the method comprising:

evaporating a zirconium halide to form a vapor;

mixing the vapor, optionally together with a carrier gas, in a mixing unit in a burner with a reaction gas of oxygen and hydrogen;

reacting said reaction gas and said vapor with each other in a flame in a closed burner chamber to form zirconium dioxide and hot waste gases;

cooling the hot waste gases and the zirconium dioxide in a heat-exchanger; and separating the waste gases from the zirconium dioxide.

4. The method according to claim 3, further comprising removing any halide remnants adhering to the zirconium dioxide obtained by heating with moistened air.

5. A zirconium dioxide, produced by flame hydrolysis, having the following properties:

zirconium dioxide content of from 96–100% by weight;

$HfO_2$ content of from 0–4% by weight;

chlorine content of less than 0.6% by weight;

specific surface area of from 20–200 $m^2/g$;

a primary particle size of from 7–100 nm;

a tamped apparent density of from 40–150 g/l;

a crystal phase of at least one of monoclinic and tetragonal phase; and a Sears number of from 1–20 ml/2 g.

6. A flame hydrolysis-method of producing a pyrogenically-produced zirconium dioxide powder having a specific surface area of from 20 to 200 $m^2/g$, primary particles of from 7 to 100 nm in size, a tamped apparent density from 40 to 150 g/l, a Sears number of from 1 to 20 ml/2 g, and a chlorine content of less than 0.6% by weight, the method comprising:

evaporating a zirconium halide to form a vapor in a partial vacuum;

mixing the vapor, together with a carrier gas, with a reaction gas of oxygen and hydrogen;

reacting said reaction gas and said vapor with each other in a flame in a closed burner chamber to form zirconium dioxide and hot waste gases;

cooling the hot waste gases and the zirconium dioxide in a heat-exchanger; and separating the waste gases from the zirconium dioxide.

* * * * *